United States Patent
Krstić et al.

(10) Patent No.: US 8,601,579 B2
(45) Date of Patent: Dec. 3, 2013

(54) SYSTEM AND METHOD FOR PRESERVING REFERENCES IN SANDBOXES

(75) Inventors: Ivan Krstić, Sunnyvale, CA (US);
Pierre-Olivier J. Martel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 13/153,274

(22) Filed: Jun. 3, 2011

(65) Prior Publication Data
US 2012/0311702 A1 Dec. 6, 2012

(51) Int. Cl.
*G06F 12/14* (2006.01)

(52) U.S. Cl.
USPC ............... 726/22; 713/164; 713/166; 726/26

(58) Field of Classification Search
None
See application file for complete search history.

(56) References Cited

U.S. PATENT DOCUMENTS

| | | | |
|---|---|---|---|
| 6,367,012 B1 * | 4/2002 | Atkinson et al. | 713/176 |
| 7,444,678 B2 * | 10/2008 | Whitmer et al. | 726/22 |
| 2007/0192623 A1 | 8/2007 | Chandrasekaran | |
| 2008/0016339 A1 | 1/2008 | Shukla | |
| 2008/0313648 A1 * | 12/2008 | Wang et al. | 719/315 |
| 2009/0112646 A1 * | 4/2009 | Bruce et al. | 705/7 |
| 2009/0216768 A1 | 8/2009 | Zwilling et al. | |
| 2011/0078790 A1 | 3/2011 | Fazunenko et al. | |
| 2012/0204250 A1 * | 8/2012 | Anderson et al. | 726/9 |

OTHER PUBLICATIONS

PCT International Search Report for PCT/US2012/037400 dated Jul. 23, 2012.

* cited by examiner

*Primary Examiner* — Kaveh Abrishamkar
(74) *Attorney, Agent, or Firm* — Blakely, Sokoloff, Taylor & Zafman LLP

(57) ABSTRACT

Disclosed herein are systems, methods, and non-transitory computer-readable storage media for preserving references in sandboxes. A system implementing the method receives a document for use in a sandbox environment and passes the document to a parser, via a coordinator. The parser finds references in the document to other resources and outputs a list of references. The system passes the list of references to a verifier that verifies each reference and outputs a list of verified references. The system passes the list of verified references to the sandboxed application which extends the sandbox to include the resources on the list of verified references. In one embodiment, the system preserves references in sandboxes without the use a coordinator.

24 Claims, 6 Drawing Sheets

SYSTEM AND METHOD FOR PRESERVING REFERENCES IN SANDBOXES

BACKGROUND

1. Technical Field

The present disclosure relates to computer security and more specifically to preserving references in documents for use in a sandbox environment.

2. Introduction

Computer security is a critical aspect of the computing world. Many different industries, including the communication, entertainment, transportation, financial, and medical industries rely on computers. Computer security involves protecting these vital computing systems by preventing and detecting computer attacks. Attackers harm computing systems in different ways such as stealing passwords, issuing denial of service attacks and distributing malicious software such as viruses and worms.

Protecting computing systems from attackers is a challenging and ever changing task. An array of methods of protecting computing systems exists, from requiring users to change passwords frequently to employing complex cryptographic algorithms on a computing system. One method to protect a computing system is to sandbox a computer program to protect a computing system from a potentially malicious program. A sandbox is a mechanism utilized to separate a running computer program from other programs and/or computing resources. Some secure computing systems execute untrusted programs, or programs distributed by untrusted parties, in sandboxes. Sandbox restrictions limit the resources a computer program may access. An example of a sandbox environment is an applet that runs in a virtual machine or interpreter, such as Adobe® Flash® or Microsoft® Silverlight®.

Documents stored in exchange formats such as Portable Document Format (PDF) or Apple® Quicktime® can contain embedded references to other files. When a computing system does not trust such a file, it can sandbox the application that accesses the untrusted file. When these documents are opened with a sandboxed application, the application is unable to follow the references to other files due to the restrictions placed on the sandboxed application by the computing system. The inaccessibility of references to other documents in a sandboxed application can be frustrating for users. Inexperienced users may simply give up and have a bad impression of the computing platform, while more experienced or technically-minded users may attempt to circumvent the sandbox, thereby inadvertently causing a potentially serious security vulnerability. Users who desire additional information from references included in a document have no way to access these references in a sandboxed application.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for preserving references in sandboxes. A system practicing the method receives a document, such as a PDF, for use in a sandbox environment. The system passes the document to a coordinator that then passes the document to a parser. The parser identifies references in the document to other resources and returns a list of references to the coordinator. The coordinator then passes the list of references to a verifier and optionally passes other parameters indicating the original document type, a desired security and/or trust level for handling the list of references, a user account, and so forth. The verifier verifies each resource associated with each reference and returns the list of verified references to the coordinator. The verifier can verify references when the reference file format is of an expected type and/or the computing system behaves as expected when the file is opened. The verifier can check other attributes of resources linked by the list of references. For example, the verifier can confirm that the resources have been appropriately signed, a checksum of the resource, file attributes of the resource, and/or other characteristics which may indicate that the resource is trusted, expected, and/or authentic. The verifier passes the list of verified references back to the coordinator which then passes the list of verified references to the application. The application can then modify the sandbox environment based on the list of verified references to yield a modified sandbox environment that includes the verified references in addition to the original document, or provides access to the resources indicated by the verified references.

In one embodiment, the system passes the document directly to the parser, without utilizing a coordinator. The parser finds references in the document to other resources and outputs a list of references. The system passes the list of references directly to the verifier, without utilizing a coordinator. The verifier verifies each resource associated with each reference and outputs a list of verified references. The verifier passes the list of verified references directly to the application, which then extends the sandbox environment to include the verified references in addition to the original document. In this embodiment, a coordinator is not utilized; instead the application communicates directly with the parser and the verifier. Although potentially less secure, this modified approach to preserving references in sandboxes is simpler than the original approach, it can be advantageous for implementation purposes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for preserving references in sandboxes. A system, method and non-transitory computer-readable media are disclosed which preserve references in documents for use in a sandbox environment. A brief introductory description of a basic general purpose system or computing device in FIG. 1 which can be employed to practice the concepts is disclosed herein. A more detailed description of preserving references in sandboxes will then follow. The disclosure now turns to FIG. 1.

Figure 1:
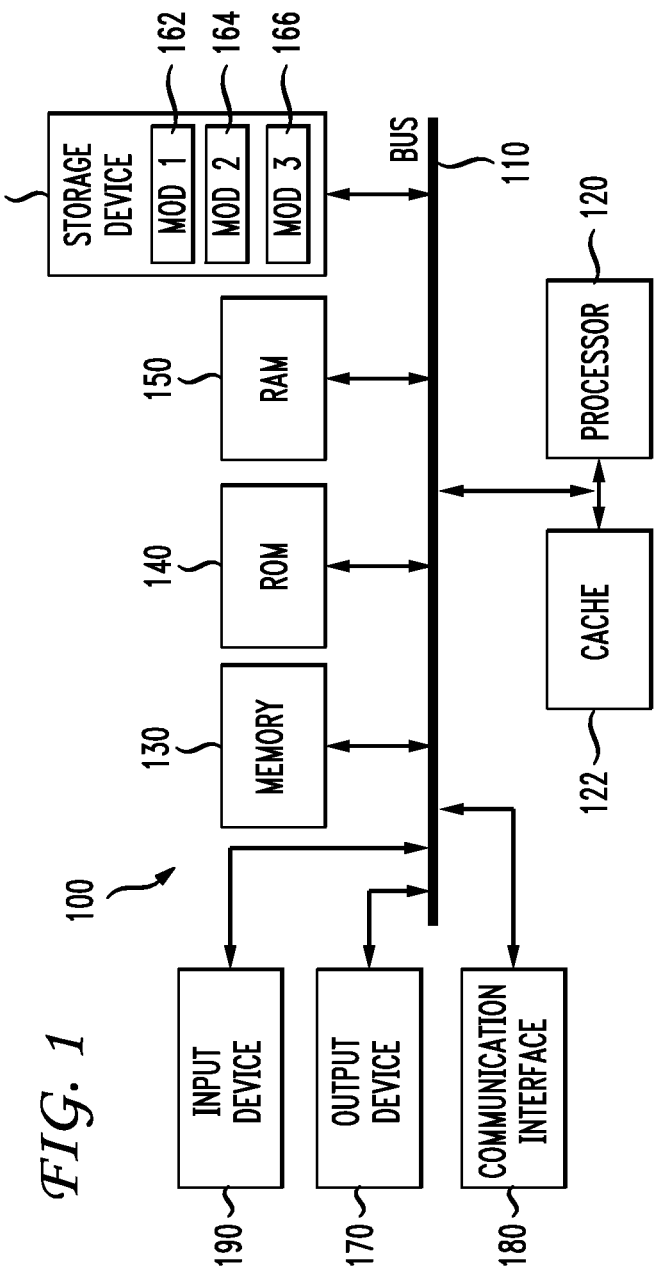
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
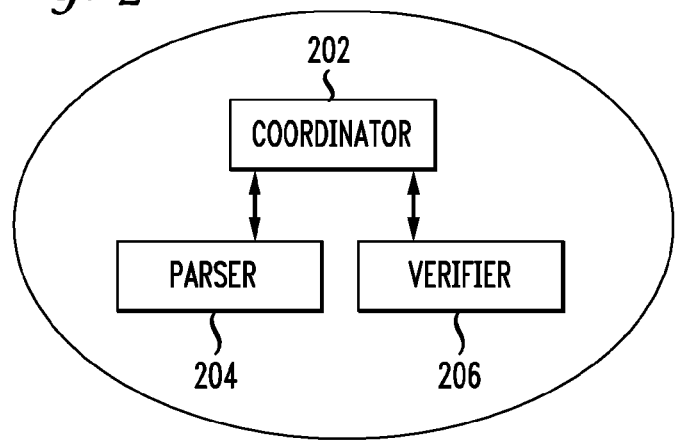
FIG. 2 illustrates a first example trusted services system embodiment including a coordinator.

Having disclosed some components of a computing system, the disclosure now returns to a discussion of handling references in a document in a sandbox environment. FIG. 2 illustrates a trio of trusted services to preserve references in a sandbox. The trio of trusted services are a coordinator 202 that coordinates the reference preservation process, a parser 204 that parses a document containing embedded references to other resources, and a verifier 206 that verifies each embedded reference to other resources. The coordinator, parser and verifier are considered trusted and each operate within their own individual sandbox, which restricts the resources each service may access. Documents stored in exchange formats such as PDF or Quicktime movie format can contain embedded references to other resources, wherein references are file paths. When documents such as these are opened in a sandboxed application, the system cannot follow the references because the sandbox does not permit access to the referenced resource which is outside of the sandbox environment. When embedded references are internal to the document, the sandboxed application has access to the resource, because the reference is internal. Internal resources do not require a sandbox extension, so the parser can just ignore them, and/or the verifier can skip over them. However, in the unlikely event that a document contains a link pointing to itself, the system can optionally extend the sandbox for that link as well. The reference preservation process described herein allows a sandboxed application to have access to verified references.

Figure 3:
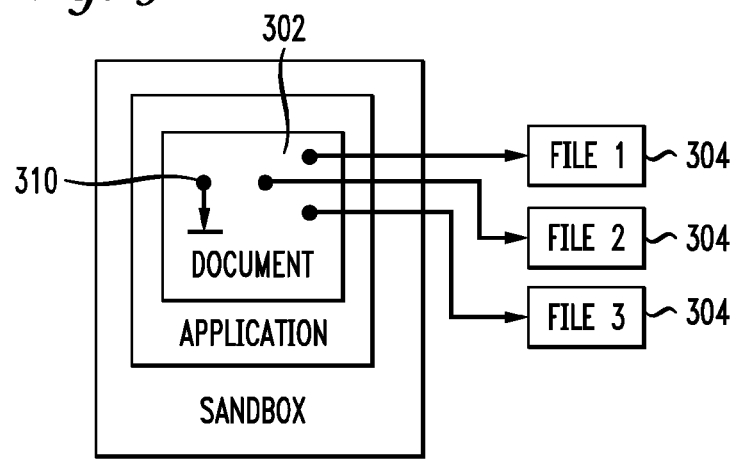
FIG. 3 illustrates an example unmodified sandbox environment for viewing a document with embedded references.
Figure 4:
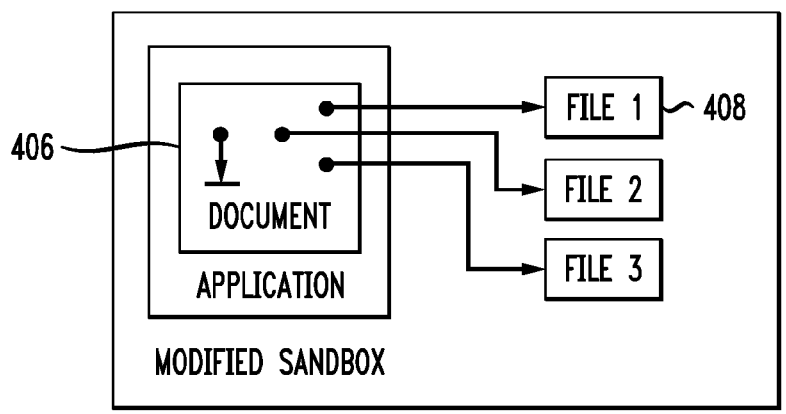
FIG. 4 illustrates an example modified sandbox environment for viewing a document with embedded references.

FIG. 3 illustrates a document storing references which is opened in an application constrained to an initial sandbox environment and FIG. 4 illustrates the document opened in an application constrained to a modified sandbox environment. The application 302 cannot access resources 304 that are external to the sandbox environment, because the computing system has placed restrictions on the application in the sandbox. However, internal references 310 are treated differently, because they do not require access to an external unverified resource. After the trusted services perform the process of preserving references in the document, the application modifies or extends the sandbox environment such that the sandbox includes the resources verified by the trusted services. A user accessing a document 406 in a modified sandbox environment has access to the verified references 408 file 1, file 2 and file 3. The system can perform the reference preservation process with references to resources locally or over a network connection, such as references to resources on the Internet.

Figure 5:
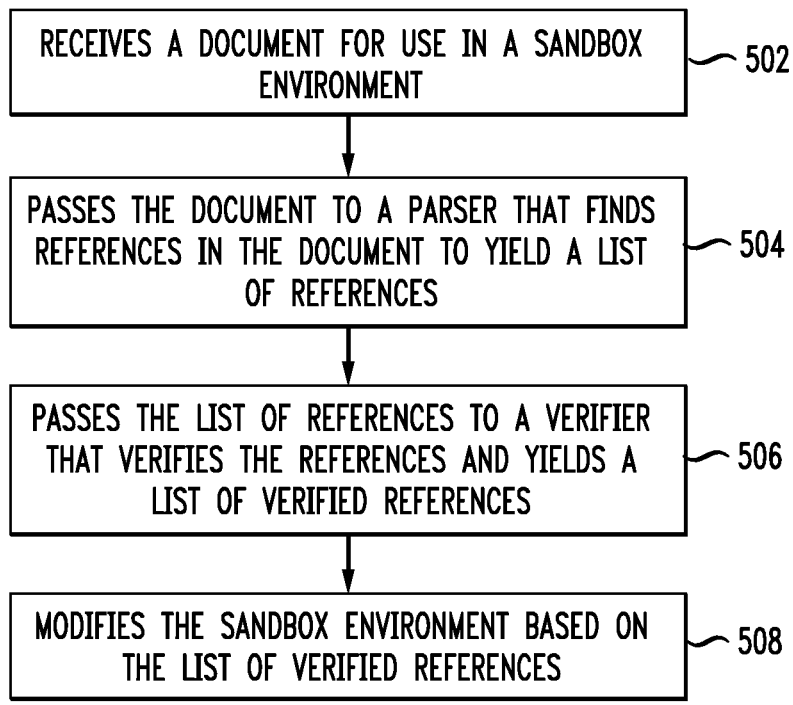
FIG. 5 illustrates a reference preservation method embodiment.

FIG. 5 illustrates an exemplary method embodiment. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. A system 100 practicing the method receives a document for use in a sandbox environment (502), passes the document to a parser that finds references in the document to yield a list of references (504), and passes the list of references to a verifier that verifies the references to yield a list of verified references (506). Then the system 100 can modify the sandbox environment based on the list of verified references (508). A document can be any computer file or multiple files that contain references to other resources, such as PDF and Quicktime documents, but not limited to these specific formats. A document requiring a sandbox environment can be a document from an untrusted source or a document that possibly has been tampered with, or a system can require that all documents undergo the reference preservation process. The system can place all documents of a specific type in a sandbox environment. Specific application or operating system settings can influence the decision whether to use a sandbox when accessing a file. The file itself can include a flag or tag indicating whether that file should be used in a sandbox or not. References to other resources in a document can be references to other computer files, or references to other files or resources within the document. The resources can be either in the same format as the original document, or in a different format. For example, an original document in PDF format can contain references to other PDF files, or any other file format specified by a user, application, coordinator or verifier such as Excel or Word. The system 100 can require that documents stored the Quicktime file format, for example, can only access other video formats such as AVI.

Figure 6:
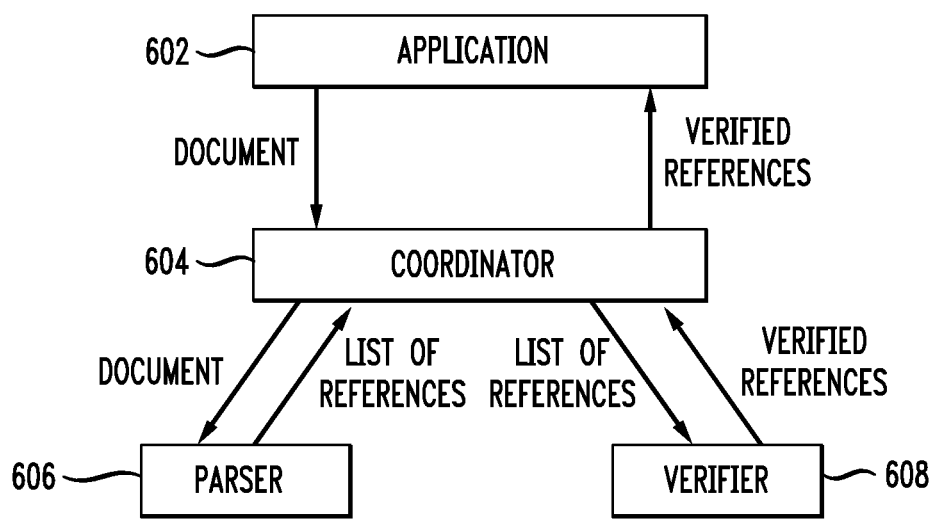
FIG. 6 illustrates an example system architecture for parsing and verifying references in a document for use in a sandbox environment.

FIG. 6 illustrates preserving references in a sandbox. An application 602 sends the document to a coordinator 604, which coordinates the verification of references to resources. The coordinator 604 passes the document to a parser 606 that finds references in the document to other resources to yield a list of references (504). The parser 606 can operate inside its own sandbox for security purposes so that the parser does not have access to any other resources other than the document or to the portion of the document passed from the coordinator. The parser 606 parses the document finding references to other files and produces a list of references found in the document. For example, the parser 606 can parse HTML for links to documents or images, can parse XML for specific tags or data, or can parse Portable Document Format (PDF) for references to other resources. The parser 606 sends the list of references back to the coordinator 604 which then sends the list of references to the verifier 608 for verification of the listed references output by the parser (506).

The verifier can also operate in its own sandbox so that opening a potentially malicious or harmful computer file does not harm the computing system. Running the parser and/or the verifier in their own sandbox environments can protects the rest of the computing system if a resource contains a threat or is otherwise unsafe. In a sandbox environment, a virus may roam freely but the system does not permit any action outside of the sandbox, thereby protecting the rest of the system.

The verifier 608 opens each resource, or file, in the list of references and compares actual system behavior with expected system behavior. The verifier can also verify that a file is an expected file type. For example, the system 100 can require that all references in the list of references for a particular document are PDF files. The verifier can verify that all the references in the list are PDF files by checking the file name extension and/or opening the file. The verifier can receive parameters and/or instructions from the coordinator 604 regarding what aspects of the references must be verified, how to verify the references, and what tolerances (if any) to apply when verifying the references. For example, the verifier can observe the system behavior when each resource is opened, and compare that behavior with expected system behavior. The verifier will not verify a reference that does not perform as expected, such as crashing a program. In one variation, the verifier simply checks that a file exists at a particular path indicated by the reference. Once the verifier completes verifying the list of references, it sends a list of verified references back to the coordinator 604, which then sends the list of verified references back to the application 602. The application extends the original sandbox for the document based on the list of verified references (508), creating a modified sandbox environment. The modified sandbox environment includes and/or provides access to the resources associated with the list of references verified by the verifier.

Figure 7:
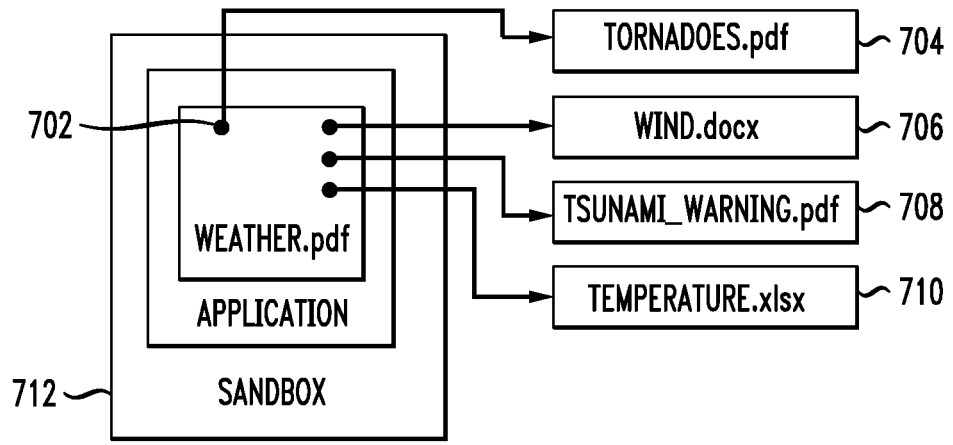
FIG. 7 illustrates an example sandbox environment.

FIG. 7 illustrates an exemplary file opened with a sandboxed application. The system opens the file weather.pdf with a sandboxed application 702. The weather file contains embedded references to tornadoes.pdf 704, wind.docx 706, tsunami_warning.pdf 708, and temperature.xlsx 710. The sandbox environment does not permit the application to access the embedded references, which can create frustration on the part of the user attempting to access the embedded references. Allowing access to references within a sandbox application can be beneficial to users who desire additional information than the document provides.

Figure 8:
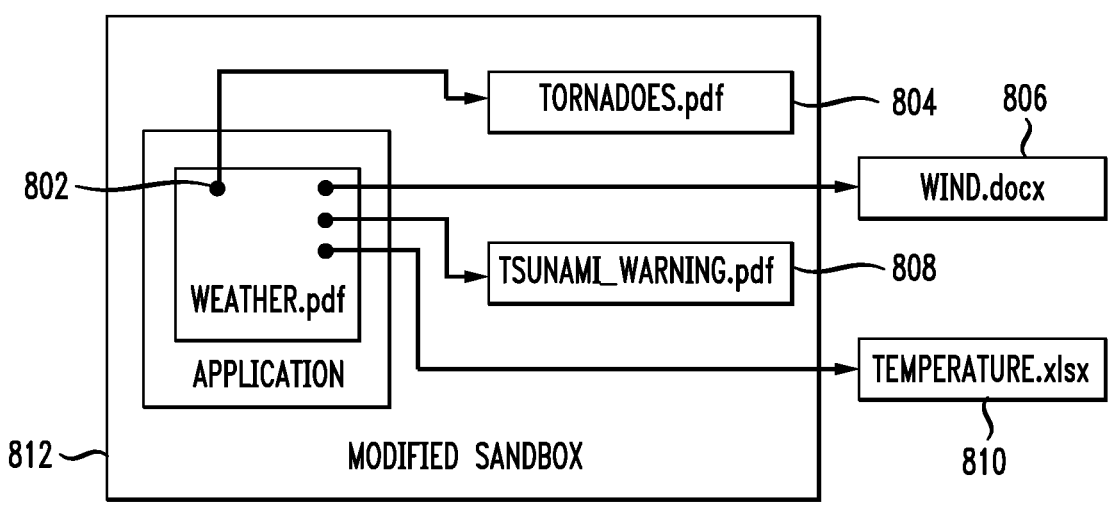
FIG. 8 illustrates an example modified sandbox environment showing verified and unverified references.

FIG. 8 illustrates a system after extracting, parsing, and verifying references in the document and extending the sandbox environment. The application sends the file weather.pdf to the coordinator, which then sends the file to the parser. The parser opens the file in a sandbox environment, finds the embedded references to resources, in this example the files tornadoes.pdf 704, wind.docx 706, tsunami_warning.pdf 708, and temperature.xlsx 710. The parser generates a list of the embedded references to these files and sends the list of references to the coordinator. The coordinator sends the list of references to the verifier 608 which operates in its own sandbox environment. The verifier can check that the file format of each file is of the expected format and/or perform additional verification measures. For example, if the system requires that the verifier only verifies PDF files for a particular document, it checks that each file is in PDF format. The verifier can receive instructions to verify only PDF files, or to verify PDF and Microsoft Word files, for example. In this example, the system requires that the verifier only verifies PDF files. The verifier can also open each file in the list of references and observe system behavior. If the system behaves as expected and the file format is of the expected type, the verifier can verify the file. The verifier sends a list of verified references to the coordinator, in this case the list of verified references are the files tornadoes.pdf 804 and tsunami_warning.pdf 808. The files wind.docx 806 and temperature.xlsx 810 are not included in the list of verified references because they are not of the expected file type, in this example, PDF. The coordinator sends the list of verified references to the application. The application extends the sandbox 712 to create a modified sandbox 812 that includes the verified references tornadoes.pdf 804 and tsunami_warning.pdf 808. The files wind.docx 806 and temperature.xlsx 810 are not permitted inside of the modified sandbox because they were not included on the list of verified references sent to the coordinator by the verifier. The application 802 inside of the modified sandbox 812 now has access to the verified references tornadoes.pdf 804 and tsunami_warning.pdf 808.

From a user's perspective, clicking on a link in weather.pdf to tornadoes.pdf 804 or to tsunami_warning.pdf 808 would be transparent. The user could click on links to those files and the system can open them because those resources are in the modified sandbox 812. However, if the user clicks on a link to wind.docx 806 or to temperature.xlsx 810, the system can deny the request to open that resource. For example, the system can simply ignore requests to access resources outside the sandbox. Alternatively, the system can present an error message to the user stating that the desired resources in inaccessible. The system can present a message to the user stating why the desired resource is inaccessible, perhaps based on a code or message returned from the verifier. Further, the system can present this and/or other information to the user and prompt the user whether or not to extend the modified sandbox environment to provide access to the inaccessible resource.

In one aspect, as part of extending or modifying the sandbox environment to include other resources referenced in the document, the system can save a temporary backup copy of the other resources which are not accessible in the modified sandbox. In this way, even if malicious code somehow executes in the modified sandbox environment and changes the resources, the system can revert to the temporary backup copy.

Figure 9:
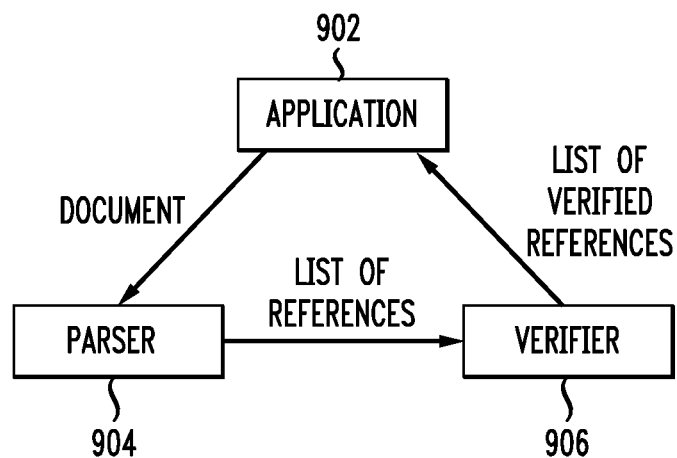
FIG. 9 illustrates a second example trusted services system embodiment without a coordinator.

In another embodiment, the system 100 preserves references in sandboxes without the use of a coordinator, as shown in FIG. 9. The application 902 in a sandbox environment sends all or part of a document having embedded references to the parser 904. The parser 904 finds references in the document and outputs a list of references. The parser 904 sends the list of references directly to the verifier 906. The verifier 906 verifies at least one reference in the list of references and generates a list of verified references. The list of verified references can include zero, one, or more references. The verifier 906 sends the list of verified references to the application 902, which then extends the sandbox to create a modified sandbox environment if at least one verified reference is included in the list. The sandbox environment is extended to include the verified references. At the expense of security, this modified approach to preserving references in sandboxes is a simpler and potentially easier to implement scheme that does not require the use of a coordinator. The coordinator is the only process that does not actually touch the resources. The coordinator does not parse the document, nor try to inspect the external resources. Therefore, the coordinator is a process that is unlikely to be the target of exploits. Thus, the coordinator can perform some extra checks that may or may not be security related with a decreased risk of exploits or other attacks.

In one aspect related to user experience and/or perceived performance, when processing a document for use in a sandbox, the system can initially load the document into a non-modified sandbox before parsing or verifying references so that the user can speedily load the document for viewing. Then, while the user is viewing the document, the system can parse and verify references in the document in the background and expand the sandbox environment based on the parsed and verified references. This provides the user perception that the document loaded quickly, while providing delayed access to the resources indicated by the references. The system can parse and verify references in the background in a batch mode or one reference at a time. For example, in a batch mode, the system parses all the references from the document, verifies all the references, then extends the sandbox environment accordingly. Alternatively, as soon as the system parses out one reference, the verifier can then verify that reference, and the system can extend the sandbox environment for that single reference, while the parser continues to search for other references. In both cases, the sandbox environment is loaded to view the document first, then the sandbox environment is expanded or otherwise modified in the background after loading the document and while the user is able to navigate, view, or otherwise access the document.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to any application that utilizes the sandbox method to protect a computing system. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, via a processor of a computing device, a document for use in a sandbox environment;
   passing the document to a parser that finds one or more references in the document to other resources to yield a list of one or more references;
   passing the list of the references to a verifier that verifies that a resource associated with each reference in the list of the one or more references exists to yield a list of verified references; and
   modifying the sandbox environment based on the list of verified references to yield a modified sandbox environment to include the verified resources.

2. The method of claim 1, further comprising loading the document in the modified sandbox environment based on the list of verified references.

3. The method of claim 2, wherein the modified sandbox environment provides access to the verified references in addition to the document.

4. The method of claim 1, wherein the sandbox environment provides access to operate within a predefined restricted set of computing resources.

5. The method of claim 1, wherein the parser operates in an individual sandbox environment.

6. The method of claim 5, wherein the individual sandbox environment allows the parser to access only the document.

7. The method of claim 1, wherein the verifier operates in an individual sandbox environment.

8. The method of claim 7, wherein the individual sandbox environment allows the verifier to access only the list of references.

9. The method of claim 1, further comprising:
   opening, by the verifier, each of the resources in the list;
   observing a behavior of the computing device in response to the opened resource;
   comparing the behavior of the computing device against an expected behavior associated with the opened resource; and
   indicating the opened resource as a verified resource if the behavior of the computing device matches the expected behavior.

10. The method of claim 9, wherein opening, observing, comparing, and indicating are performed by the verifier in an individual sandbox environment.

11. The method of claim 10, wherein the verifier receives one or more parameters from the processor specifying how to verify each of the resources in the list.

12. The method of claim 11, wherein the one or more parameters further specify a tolerance of a difference between the behavior of the computing device and the expected behavior.

13. The method of claim 1, wherein the verifier only verifies a reference that is external to the document, and wherein an internal reference does not require a modification of the sandbox environment.

14. The method of claim 1, further comprising opening the document for access, while parsing and verifying the references in parallel in a background process, and wherein the references are unavailable for access until they have been verified.

15. A system for processing references, the system comprising:
   a processor; and
   a memory storing instructions for controlling the processor to perform operations, the operations comprising:
   receiving a document for use in a sandbox environment, passing the document to a parser that finds one or more references in the document to other resources to yield a list of one or more references, passing the list of the references to a verifier that verifies that a resource associated with each reference in the list of the one or more references exists to yield a list of verified references, and modifying the sandbox environment based on the list of verified references to yield a modified sandbox environment to include the verified resources.

16. The system of claim 15, wherein each reference in the list of references is a file path.

17. The system of claim 15, wherein verifying the respective resource comprises comparing an actual resource format with an expected resource format.

18. The system of claim 17, wherein the expected resource format matches a format of the document.

19. The system of claim 17, wherein the expected resource format is different from a format of the document.

20. The system of claim 15, wherein verifying the respective resource comprises opening the respective resource and comparing actual system behavior to expected system behavior.

21. The system of claim 15, wherein the instructions further control the processor to establish a sandbox environment within which to receive the list of references, verify the respective resource, and return the list of verified references.

22. The system of claim 21, wherein the sandbox environment provides access to operate within a predefined restricted set of computing resources.

23. The system of claim 21, wherein the predefined restricted set of computing resources comprises the list of references.

24. A non-transitory computer-readable storage medium storing instructions which, when executed by a computing device, cause the computing device to perform a method to preserve references in a sandbox environment, the method comprising:

receiving, via a processor of a computing device, a document for use in a sandbox environment;

passing the document to a parser that finds one or more references in the document to other resources to yield a list of one or more references;

passing the list of the references to a verifier that verifies that a resource associated with each reference in the list of the one or more references exists to yield a list of verified references; and modifying the sandbox environment based on the list of verified references to yield a modified sandbox environment to include the verified resources.

* * * * *